US005998691A

United States Patent [19]

Abel et al.

[11] Patent Number: 5,998,691

[45] Date of Patent: Dec. 7, 1999

[54] METHOD AND APPARATUS TO DESTROY CHEMICAL WARFARE AGENTS

[75] Inventors: Albert E. Abel, Powell; Robert W. Mouk, Westerville, both of Ohio; Alan F. Heyduk, Cambridge, Mass.; Bentley J. Blum, New York, N.Y.; Gerry D. Getman, Houston, Tex.; Mark D. Steskal, Westerville, Ohio

[73] Assignee: Commodore Applied Technologies, Inc., New York, N.Y.

[21] Appl. No.: 09/061,603

[22] Filed: Apr. 16, 1998

Related U.S. Application Data

[63] Continuation of application No. PCT/US96/16303, Oct. 10, 1996

[60] Provisional application No. 60/006,278, Nov. 7, 1995.

[51] Int. Cl.[6] .............................. A62D 3/00; B01J 10/00; B01D 11/02

[52] U.S. Cl. .......................... 588/200; 588/202; 588/203; 588/205; 149/124; 570/262; 422/129; 422/224; 422/261; 422/267

[58] Field of Search .................................... 588/203, 200, 588/202, 205, 18; 149/124; 570/262; 422/129, 224, 261, 267

[56] References Cited

U.S. PATENT DOCUMENTS

| | | | |
|---|---|---|---|
| 3,634,278 | 1/1972 | Wolverton | 252/192 |
| 4,666,696 | 5/1987 | Shultz | 423/659 |
| 4,784,699 | 11/1988 | Cowsar et al. | 134/42 |
| 4,793,937 | 12/1988 | Meenan et al. | 210/771 |
| 4,853,040 | 8/1989 | Mazur et al. | 134/2 |
| 5,110,364 | 5/1992 | Mazur et al. | 134/2 |
| 5,387,717 | 2/1995 | Puckett et al. | 564/295 |
| 5,495,062 | 2/1996 | Abel | 588/1 |
| 5,514,352 | 5/1996 | Hanna et al. | 422/225 |
| 5,545,799 | 8/1996 | Ritter | 588/200 |
| 5,545,800 | 8/1996 | Upadhye | 588/231 |
| 5,613,238 | 3/1997 | Mouk et al. | 588/1 |
| 5,640,702 | 6/1997 | Shultz | 588/1 |
| 5,763,737 | 6/1998 | Yang et al. | 588/218 |

FOREIGN PATENT DOCUMENTS 0 635 283 1/1995 European Pat. Off. .

OTHER PUBLICATIONS

Yang, Yu–Chu, Chemical Reactions for Neutralising Chemical Warfare Agents, Chemistry and Industry, p. 334–337, 1995.

Kennedy, M.V. et al., Chemical and Thermal Aspects of Pesticide Disposal; J. Environ. Quality, vol. 1, No. 1, 1972, pp. 63–65.

*Primary Examiner*—Gary P. Straub

*Assistant Examiner*—M. C. Wong

*Attorney, Agent, or Firm*—Howard M. Ellis; Marianne Fuierer

[57] ABSTRACT

Chemical warfare agents, including vesicants and nerve agents distributed throughout the world, are destroyed when chemically reacted according to the method and utilizing the apparatus of this invention. The method comprises reacting the chemical warfare agents with nitrogenous base, optionally containing solvated electrons which are conveniently produced by dissolving an active metal like sodium in a nitrogenous base such as anhydrous liquid ammonia.

34 Claims, 1 Drawing Sheet

METHOD AND APPARATUS TO DESTROY CHEMICAL WARFARE AGENTS

CROSS REFERENCE TO RELATED APPLICATION

This application is a continuation of International Application No. PCT/US96/ 16303, filed Oct. 10, 1996, which claims priority under U.S. Provisional Application Ser. No. 60/006,278, filed Nov. 7, 1995.

TECHNICAL FIELD

The present invention relates to an improved method and apparatus for the destruction of chemical warfare agents; more particularly, a chemical method which utilizes nitrogenous base, optionally in combination with active metal, which provides a powerful dissolving metal reduction featuring solvated electrons and leads to substantially complete destruction of such agents.

BACKGROUND OF THE INVENTION

Chemical warfare agents have sometimes been defined as including poison gases, incendiary materials, and biological microorganisms employed to disable personnel, as well as pesticides, herbicides, and similar substances which can be employed to interfere with the growth of plants, insects, and other non-mammalian species; in this regard, see the definition "chemical warfare" which appears in the "Concise Encyclopedia of Science & Technology," Second Ed., McGraw-Hill Book Co., New York, N.Y. (USA), 1989.

As employed herein, the term "chemical warfare agent," which is sometimes abbreviated as "CWA", is intended to include only those agents which are effective in relatively small dosages to substantially disable or kill mammals. Thus, the definition excludes substances which are agricultural chemicals used primarily to control plants, Hexapoda, Arachnida, and certain fungi. Furthermore, for purposes of this invention, the term "chemical warfare agent" also excludes those replicating microorganisms commonly known as biological warfare agents, including viruses, such as equine encephalomyelitis; bacteria, such as those which cause plague, anthrax and tularemia; and fungi, such as coccidioidomycosis; as well as toxic products expressed by such microorganisms; for example, the botulism toxin expressed by the common *Clostridium botulinium* bacterium.

Also excluded from the term "chemical warfare agent," as it is used herein, are those naturally occurring poisons, such as capisin (an extract of cayenne pepper and paprika), ricin (a toxic substance found in the castor bean), saxitoxin (a toxic substance secreted by certain shellfish), cyanide salts, strychnine (a plant-derived alkaloid), and the like. In addition, the term "chemical warfare agent" is not intended to encompass incendiaries such as napalm or explosives such as gunpowder, TNT, nuclear devices, and so forth.

On the other hand, a series of "poison gases" appeared on battlefields in the World War I era. These substances are primarily gases near room temperature and include cyanogen chloride, hydrogen cyanide, phosgene and chlorine. These poisonous gases are included within the definition of the term "chemical warfare agent" as used herein. That term is also intended to encompass those primarily liquid substances, including vesicants which were first used in World War I, and refinements, such as the nerve agents, which have appeared on the scene more recently.

The term "chemical warfare agent" in this application includes substantially pure chemical compounds, but the term also contemplates mixtures of the aforesaid agents in any proportions, as well as those agents in impure states in which the other components in the mixture are not simply other CWA's. "Chemical warfare agents," as used herein, also includes partially or completely degraded CWA's, e.g., the gelled, polymerized, or otherwise partially or totally decomposed chemical warfare agents commonly found to be present in old munitions.

In January 1993, representatives from more than 130 nations signed the final draft of the Chemical Weapons Convention, which outlaws the production, use, sale, and stockpiling of all chemical weapons and their means of delivery and calls for the destruction of existing stocks by the year 2005. About sixty of the signatory nations have ratified the treaty. In 1993, some 20 nations were suspected of possessing chemical arsenals or having the means to make them.

An estimated 25,000 tons of CWA's in the United States and 50,000 tons of CWA's in the former Soviet Union, contained in bulk storage vessels, metal barrels, canisters, rockets, land mines, mortar and artillery shells, cartridges, and missiles, must be destroyed if the 1993 Convention is to be carried out. The costs for carrying out this destruction have been estimated at US$ 8 billion and US$ 10 billion, respectively, for the United States and the former Soviet Union alone.

Over the years a number of studies have designated incineration as the preferred method of destruction for CWA's because of the perceived low cost and relative simplicity of incineration technology. However, it is becoming clear that incineration of chemical warfare agents poses risks of both an immediate and long term nature which may not be acceptable to the population. Public health and ecosystem integrity are threatened by the emission of materials which can escape the combustion train, resulting in uncharacterized products of incomplete combustion becoming dispersed into the atmosphere.

Less than 72 hours after start-up, the U.S. Army had to shut down its first domestic CWA destruction facility in Tooele, Utah, located in a sparsely populated region in the western United States, when the nerve agent Sarin was detected in an area outside the chamber in which Sarin-filled rockets were being destroyed. It is unclear if or when the facility will resume its activities.

Earlier public opposition to incineration had forced U.S. government authorities to consider alternative methods, including chemical treatment of the CWA's, capable of leading to environmentally neutral products. However, this concept was dismissed in the United States after publication in 1984 of a National Research Council report stating that, when compared to incineration, chemical neutralization processes "are slow, complicated, produce excessive quantities of waste that cannot be certified to be free of agent, and would require higher capital and operating cost."

Alternatives to incineration are cited, for example, in the table of contents from the "Proceedings, Workshop on Advances in Alternative Demilitarization Technologies," held in Reston, Va. USA on Sep. 25–27, 1995. Technical papers presented relate to molten salt oxidation, supercritical water oxidation, electrochemical oxidation, neutralization, hydrolysis, biodegradation, steam-reforming, and so forth.

The chemical treatments proposed in the past for destroying chemical warfare agents were not entirely satisfactory. For example, the treatments were not universally applicable. It should be recognized that most chemical reagents are species-specific; that is, a chemical reagent generally reacts with a substance having a certain specific functional group. An acid reacts with a base, much less commonly with another acid. An oxidizing agent reacts with an oxidizable substance, such as a reducing agent. With such species-specific chemistry, destruction of a CWA would require one to first establish the identity of the CWA or the mixture of CWA's to be destroyed in order to select the right reagent or combination of reagents to react with that particular material.

Operationally, chemical processing, as envisioned in the past, would frequently require handling and transferring of CWA's by human operators. Such handling operations could include, for example, removal of the CWA from a warhead or missile casing, canister or other containerized delivery system, thereby exposing personnel to the grave danger of contact with the CWA. Loading the CWA so-removed from its container into a separate reaction vessel would lead to another opportunity for exposure to the CWA.

Finally, chemical methods previously proposed for the destruction of chemical warfare agents were believed to have unacceptable capital requirements for equipment, facilities, and personnel safeguards, as well as requiring time-consuming, labor-intensive processing. Then, there was also envisioned the further cost of disposing of the products after the CWA destruction chemistry had been carried out. In light of all this, one can understand why, compared against such chemical treatments, incineration of the CWA's, producing water, carbon dioxide and inorganic salts (ideally), seemed attractive indeed. However, incineration is turning out to be less than the anticipated panacea.

SUMMARY OF THE INVENTION

Accordingly, there has been and continues to be a need for a safer, more generally applicable chemical method and related apparatus for destroying CWA's. The goals to be achieved by the long sought method include the capability of destroying a wide range of agents with differing functional groups, safely, simply and economically with minimal effect on the environment, the flexibility to be employed over a wide range of temperatures, as well as the versatility to handle the CWA's regardless of their current locus and physical state.

It is the objective of this invention to provide a chemical method and a reactor system for destroying CWA's which attains the aforesaid goals. Accordingly, the method, in its preferred embodiment, subjects CWA's to a "dissolving metal reduction." More specifically, the preferred method comprises the steps of creating a reaction mixture prepared from raw materials which include nitrogenous base, at least one CWA, and active metal in an amount sufficient to destroy the chemical warfare agent, and then reacting the mixture.

Dissolving metal reduction chemistry is not new; it is embodied in the well known "Birch Reduction," which was first reported in the technical literature in 1944. The Birch Reduction is a method for reducing aromatic rings by means of alkali metals in liquid ammonia to give mainly the dihydro derivatives; see, e.g., "The Merck Index," 12th Ed., Merck & Co., Inc., Whitehouse Station, N.J. USA, 1996, p. ONR-10.

Such dissolving metal reductions have been the subject of much investigation and numerous publications. Reviews include the following: G. W. Watt, *Chem. Rev.,* 46, 317–379 (1950) and M. Smith, "Dissolving Metal Reductions," in "*Reduction: Techniques and Applications in Organic Synthesis*," ed. R. L. Augustine, Marcel Decker, Inc., New York, N.Y., 1968, pages 95–170. Dissolving metal reduction chemistry is applicable to compounds containing a wide range of functional groups. For example, the reaction of pesticides with sodium and liquid ammonia was reported some years ago; M. V. Kennedy and coworkers, *J. Environ. Quality,* 1, 63–65 (1972).

It is believed that the dissolution of an active metal, such as sodium, in a nitrogenous base, such as liquid ammonia, produces "solvated electrons," which are responsible for the intense blue color of the resultant solutions; that is:

$$Na+(NH_3)_x \rightarrow Na^+ \text{ (solvated)} + e^- \text{ (solvated)} \qquad (I)$$

According to the present invention, the preferred method for destroying a chemical warfare agent comprises, in a broad sense, treating the CWA with solvated electrons. The method is applicable to the destruction of, not only CWA's which are still primarily in the state in which they were produced, but surprisingly, also to CWA's which have deteriorated, possibly over a number of years of storage, in some cases since the days of World War I, so that they are now gelled, polymerized, or otherwise transformed from their original state. The additional problems brought about by deterioration of the CWA's has been recognized and reported; see for example, J. F. Bunnett, *Pure & Appl. Chem.,* 57, 841–858 (1995).

In addition, the method of this invention has been found, quite unexpectedly, to be well suited to destroy the CWA's, not only when presented in bulk, but also when still contained in the munitions in which they are found, in spite of the contaminants present there and the side reactions made possible by those contaminants. The reaction mixture can be created in situ, i.e., in the very shells, cartridges, missiles, or munitions in which they are found.

Many, if not most, chemical reactions, such as reactions between acids and bases, the hydrolysis of esters and amides with water, enolizations, and so forth are equilibria, the consequence of which is that the forward reactions do not go to completion. If such a reaction is used to treat a CWA, there is a distinct possibility that the CWA will not be completely destroyed in the process. Surprisingly, the treatment of a CWA using the preferred method of this invention regularly leads to products in which residual CWA content is below the limit of detectability using conventional techniques employed for CWA's. Such techniques include gas chromatography/mass spectroscopy ("gc/ms") as well as wet chemistry. That is, the well known 1,2-ethane dithiol derivatization procedure used for the vesicant Lewisite, the DB-3 manual method employed for HD mustard, and the cholinesterase inhibition procedure employed for the nerve agents GA, GB, GD, and VX; see for example, M. Waters, "Laboratory Methods for Evaluating Protective Clothing Systems Against Chemical Agents," CRDC-SP-84010, U.S. Army Armament, Munitions & Chemical Command, Aberdeen Proving Ground, Md. 21010 USA, June 1984.

By employing the method of this invention, at least about 90 percent by weight of the CWA, often more than about 95%, and in favorable cases, more than 97% is destroyed. Under optimum conditions, the method of this invention leads to at least about 99% destruction of the chemical warfare agent, for example, at least about 99.998 percent can be destroyed.

Whereas not intending or desiring to be bound by this explanation, in retrospect, this fortunate result, at least in the case of the preferred embodiment of the method, may be due to the fact that the chemical reaction is not an ordinary chemical equilibrium. The reaction of solvated electrons at a chemical bond, A-B, may proceed as follows:

$$A{-}B + 2[Na^{+}(\text{solvated})\ e^{-}(\text{solvated})] \downarrow Na^{+}A^{-}(\text{solvated}) + B^{-}Na^{+}(\text{solvated})$$

The reaction may proceed to substantial completion because the energy input required to reach the transition state from the solvent-stabilized products is very high, due to the repulsive force between the $A^-$ and the $B^-$ anions.

The method of this invention provides for the destruction of highly toxic CWA's, generally producing substances of substantially less or substantially no toxicity to mammals. In the context of this invention, the terms "destroying," "destruction" or the like as applied to chemical warfare agents means transforming the chemical warfare agent into another chemical entity. That is, a least one chemical bond must be broken to "destroy" a CWA. Solvated electrons, unlike other species-specific reagents proposed for chemical warfare agents, are capable of performing as powerful reducing agents with respect to an extensive range of CWA's, converting them to salts and, for example, covalently bonded organic compounds which are significantly lower in toxicity than the CWA's. The resulting products are amenable to further treatment, if desired.

The preferred embodiment of the method of this invention can be demonstrated with the CWA commonly known as "Sarin" or "GB," or methylphosphonofluoridic acid 1-methyl ethyl ester, or isopropyl methyl phosphonofluoridate, an extremely active cholinesterase inhibitor with a lethal dose for man as low as 0.01 mg/kg body weight, and the CWA commonly known as "Soman" or "GD," or methylphosphonofluoridic acid 1,2,2-trimethylpropyl ester, or pinacolyl methyl phosphonofluoridate, also having a lethal dose as low as 0.01 mg/kg body weight. Individually or together in a mixture, both can be effectively destroyed with solvated electrons prepared in a dissolving metal reaction with a nitrogenous base, such as anhydrous liquid ammonia. The product does not contain CWA in an amount which is detectable by ordinary analytical methods.

Destruction of a CWA by the method of this invention does not necessarily require active metal. In a second embodiment of the method of this invention, an active metal is not employed, and the method comprises the steps of creating a reaction mixture from raw materials which consist essentially of nitrogenous base and at least one CWA, and then reacting the mixture. The nerve gas commonly known as "Tabun" or "GA," or dimethylphosphoramidocyanidic acid ethyl ester, or ethyl N,N-dimethyl phosphoroamicocyanidate, a potent cholinesterase inhibitor which is toxic not only by inhalation but also by absorption through skin and eyes with a lethal dose for man as low as 0.01 mg/kg body weight, is effectively destroyed by contacting the CWA with nitrogenous base alone, such as, for example, anhydrous liquid ammonia, as described in greater detail hereinafter.

Optionally, the product of this second embodiment, as well as the product of the preferred embodiment described above, can be oxidized; for example, with hydrogen peroxide, ozone, metal permanganate, dichromate, or another of the many oxidizing agents well known to those skilled in the art, producing environmentally benign products such as water and carbon dioxide.

It is usually easier to create the solvated electrons which are required to carry out the preferred process of this invention by chemical means, such as the reaction between nitrogenous base and active metal. However, the destruction of a CWA by the method of this invention can be practiced, regardless of the source of the solvated electron reagent. For example, it is known that solvated electrons can be produced in nitrogenous base, as well in other solvating liquids, by electrochemical means. The resultant solvated electron-containing medium can also be employed in the process of this invention by contacting the CWA with that medium.

Although the process of this invention is perhaps most readily practiced with bulk supplies of CWA's, the invention also contemplates the demilitarization of munitions in the delivery systems housing the chemical warfare agents. In an important variation, the process can be practiced in a manner which minimizes the handling of the chemical warfare agents and the potential for exposure of process operating personnel to the lethal CWA's.

Advantageously, the method of this invention can be carried out without removing the chemical warfare agents from their native containers or analyzing to determine which specific agents are present. Instead, the present invention contemplates that the reactions constituting the method be performed, where practical, directly in the munition, shell, canister, missile, barrel, or bulk packaging vessel containing the CWA, thereby minimizing worker exposure. That is, the reaction mixture, including the nitrogenous base, active metal if necessary, and the CWA, can be created in situ within the native container, optionally where it is found and in the state in which it is found.

Techniques have been developed and are available by which warheads and other native containers can be penetrated. Holes produced in the native container shells or casings provide access through which the nitrogenous base and, if necessary, the active metal, can be injected. Alternatively, the solvated electron-containing reagent can be produced outside the native container and introduced through an opening in the native container. Furthermore, the processing is so inexpensive and uncomplicated that treatment of the CWA's in their native containers where they are found from a solvated electron generator mounted on a mobile vehicle is contemplated. The solvated electron-containing reagent can also be injected to rinse and decontaminate containers previously used to house chemical warfare agents.

The method of the invention also includes detoxification and decontamination of containment devices, equipment, tools, clothing, soils, and other matrices and substrates contaminated with CWA's.

Although the method of this invention can be carried out in the native containers in which the CWA's are found, in many cases, especially if the CWA is available in bulk, it may be convenient to carry out the preferred process of this invention in the apparatus of this invention. In a broad sense, the apparatus of this invention is a reactor system which is applicable to conducting a chemical reaction between a wide array of organic compounds, preferably liquid or liquefiable compounds, and a reagent optionally including solvated electrons.

The reactor system comprises a reaction vessel to contain the organic compound in admixture with nitrogenous base, optionally containing solvated electrons, a condenser for treating gas evolved from the reaction vessel, a decanter for receiving reaction products from the reaction vessel and separating the reaction products into a liquid fraction and a solid fraction, and a dissolver for receiving the solid fraction and treating it with water, producing a fluid mixture for further disposition.

The method and apparatus of this invention will be clarified by reference to the drawing which accompanies this verbal description and the Examples which follow.

BEST MODES FOR CARRYING OUT THE INVENTION

Figure 1:
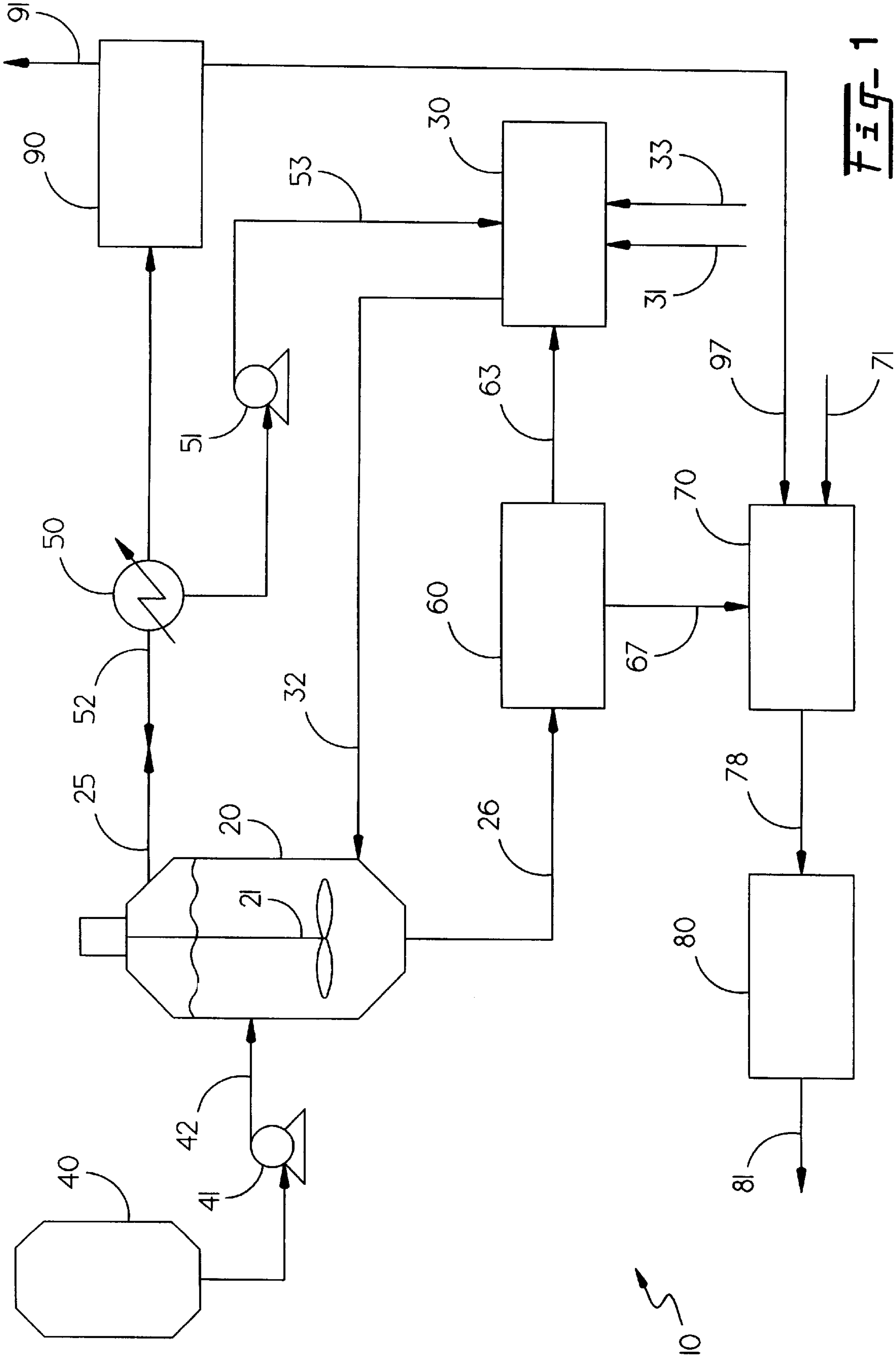
FIG. 1 is a flow diagram illustrating one embodiment of the reactor system of this invention.

Although the process of this invention is applicable to the destruction of a wide range of CWA's, the method is especially effective when the CWA is selected from the group consisting of vesicants, nerve agents, and mixtures thereof, the formula of said vesicants containing at least one group of the formula:

(III)

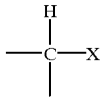

in which X is halogen; said nerve agents being represented by the formula:

(IV)

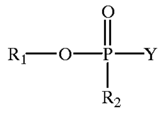

in which $R_1$ is alkyl, $R_2$ is selected from alkyl and amino, and Y is a leaving group.

In the vesicants to which the process of this invention can be applied it is preferred that X in the aforesaid formula (III) be selected from fluorine, chlorine and bromine. In the vesicants most commonly found around the world, X is chlorine, and it is especially preferred that X in formula (III) be chlorine for that reason. Two of the most widely available, and thus important, vesicants to which the process is applicable are mustard gas, also called "HD," or 1,1'-thiobis[2-chloroethane), or di(2-chloroethyl) sulfide and "Lewisite," or dichloro(2-chlorovinyl)arsine.

Both of these chemical warfare agents were employed in World War I, and munitions constructed in that era, about 75 years ago, and containing these CWA's are still to be found in the field, old warehouses, and so forth. At least in the case of some of the munitions containing HD mustard, some, most, or all of the HD has deteriorated into a gel or crusty polymerized material of undefined structure and composition. It has been found, quite unexpectedly, that the CWA destruction process of this invention is effective in destroying, not only the HD, but also the gelled and crusty products of the HD degradation, termed "HD heel."

While not intending to be bound by this representation, it is believed that the destruction of HD with solvated electrons produced by dissolving an active metal, represented by sodium, in a nitrogenous base, represented by liquid ammonia, proceeds as follows:

$$[ClCH_2CH_2]_2S + 4\,Na \xrightarrow{(NH_3)} [CH_2{=}CH]_2S + 2\,NaCl + NaNH_2 + H_2$$

Whereas an unquantifiable weight of gummy residue is one of the components of the product, C and S elemental analyses are consistent with divinyl sulfide.

While not intending to be bound by this representation, it is believed that the destruction of Lewisite with solvated electrons produced by dissolving an active metal, represented by sodium, in a nitrogenous base, represented by liquid ammonia, proceeds as follows, the dissolving metal reduction being optionally followed by an oxidation, e.g., with hydrogen peroxide:

$$Cl_2As{-}CH{=}CHCl + 8\,Na \xrightarrow{(NH_3)} Na_3As + 3\,NaCl + Na^+C^-{\equiv}C^-Na^+$$

$$\downarrow [O]$$

$$Na_3(AsO_4) + HC{\equiv}CH$$

The sodium arsenate can be precipitated with, for example, a calcium salt and recovered as calcium arsenate. The acetylene can be collected in a cold trap. The process is also effective in destroying a related CWA called "Adamsite," or phenarsazine chloride.

In the nerve agents of formula (IV) to which the process of this invention can be applied, Y is a leaving group; that is, Y is an atomic grouping which is energetically stable as an anion, the more preferred leaving groups being those which are most readily displaced from carbon in nucleophilic substitutions and, as anions, have the greatest stability. Although a host of such leaving groups are well known, it is preferred that the leaving group Y be selected from halogen, nitrile (—CN), and sulfide (—S—), since these are the groups Y present in the nerve agents distributed most widely throughout the world. Among the halogens, it is most preferred that Y be fluorine, chlorine or bromine, fluorine being especially effective in the most readily available nerve agents.

$R_1$ in formula (IV) can be alkyl, preferably lower alkyl, i.e., $C_1$–C6, straight chain or branched or cyclic, e.g., methyl, ethyl, propyl, iso-propyl, iso-butyl, tert-butyl, cyclohexyl, or trimethylpropyl. $R_1$ in the most widely distributed nerve agents is methyl, ethyl or 1,2,2-trimethylpropyl and so these alkyl groups are preferred for that reason.

$R_2$ in formula (IV) can be alkyl or amino. In the case that $R_2$ is alkyl, it is preferred that alkyl be as defined above for $R_1$, alkyl $R_2$ in the most widely distributed nerve agents being methyl, the most preferred alkyl $R_2$ being methyl for that reason. In the case that $R_2$ is amino, $R_2$ can be primary, secondary or tertiary alkylamino, or dialkylamino, or trialkylamino, alkyl being as defined above for $R_1$, dialkylamino being preferred, with dimethylamino being especially preferred for the reason that $R_2$ is dimethylamino in the most widely distributed nerve agent in which $R_2$ is amino.

Specific nerve agents which are widely distributed around the world, and hence are the most important nerve agents to which the process of this invention can be applied, are:

"Tabun," or "GA," or dimethylphosphoramido-cyanidic acid, or ethyl N,N-dimethyl phosphoroamido-cyanidate; "Sarin," or "GB," or methylphosphonofluoridic acid 1-methyl ethyl ester, or isopropyl methyl phosphono-fluoridate; "Soman," or "GD," or methylphosphonofluoric acid 1,2,2-trimethylpropyl ester, or pinacolyl methyl phosphono-fluoridate; and "VX," or methylphosphonothioic acid S-[2-[bis(1-methyl ethyl)amino]ethyl] ethyl ester, or ethyl S-2-diisopropyl aminoethyl methylphosphorothioate.

While not intending to be bound by this representation, it is believed that the destruction of "Tabun" with solvated electrons produced by dissolving an active metal, represented by sodium, in a nitrogenous base, represented by liquid ammonia, proceeds as follows, the dissolving metal reduction being optionally followed by an oxidation step, e.g., with hydrogen peroxide:

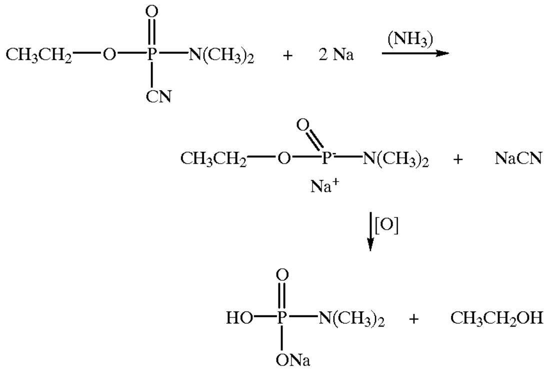

While not intending to be bound by this representation, it is believed that the destruction of "Sarin" and "Soman" with solvated electrons produced by dissolving an active metal, represented by sodium, in a nitrogenous base, represented by liquid ammonia, proceeds as follows, the dissolving metal reduction being optionally followed by an oxidation, e.g., with hydrogen peroxide:

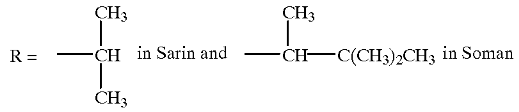

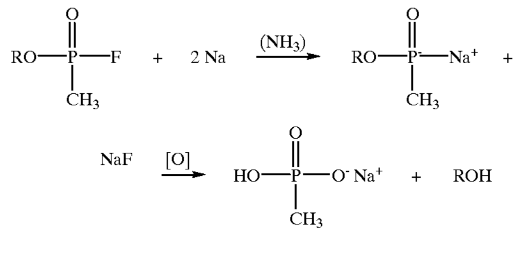

While not intending to be bound by this representation, it is believed that the destruction of "VX" with solvated electrons produced by dissolving an active metal, represented by sodium, in a nitrogenous base, represented by liquid ammonia, proceeds as follows, the dissolving metal reduction being optionally followed by an oxidation, e.g., with hydrogen peroxide:

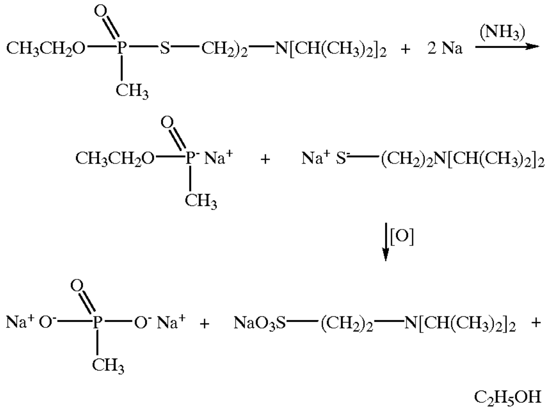

With regard to the active metal to be employed in the preferred embodiment of the method of this invention, whereas the literature reports the use of a number of other metals, such as Mg, Al, Fe, Sn, Zn, and alloys thereof, in dissolving metal reductions, in the method or process of this invention, it is preferred that the active metal be selected from one or a combination of the metals found in Groups IA and IIA of the Periodic Table of the Elements; that is, the alkali and alkaline earth metals. Largely for reasons of availability and economy, it is most preferred that the active metal be selected from Li, Na, K, Ca, and mixtures thereof. In most cases, the use of sodium, which is widely available and inexpensive, will prove to be satisfactory.

The nitrogenous base which is required in this process can be selected from ammonia, amines, and the like, or mixtures thereof. Anhydrous liquid ammonia is readily available, since it is widely employed as a fertilizer in agricultural applications. Consequently, it is also relatively inexpensive and so is the preferred nitrogenous base. However, ammonia boils at about −33° C., requiring that solutions of liquid ammonia be cooled, that the solution be pressurized, or both. In those cases where this is inconvenient, a number of amines are readily available and can be employed as the nitrogenous base.

Representative classes of useful amines include primary amines, secondary amines, tertiary amines, and mixtures thereof. Specific examples of such amines include alkyl amines, like methyl amine, ethyl amine, n-propyl amine, iso-propylamine, 2-methylpropylamine, and t-butylamine, which are primary amines; as well as dimethylamine and methylethylamine, which are secondary amines; and tertiary amines, such as triethyl amine. Di- and trialkylamines can also be employed, as can saturated cyclic amines such as piperidine. Amines which are liquids at the desired reaction temperature are preferred and, among these amines, methylamine (bp −6.3° C.), ethyl amine (bp 16.6° C.), propylamine (bp 49° C.), isopropyl-amine (bp 33.0° C.), butylamine (bp 77.8° C.), and ethylene-diamine (bp 116.5° C.), are especially useful.

In some cases it will be advantageous to combine the nitrogenous base with another solvating substance such as an ether; for example, tetrahydrofuran, diethyl ether, dioxane, or 1,2-dimethoxyethane, or a hydrocarbon; for example, pentane, decane, and so forth. In selecting the nitrogenous base and any cosolvents to be included therewith, it should be borne in mind that solvated electrons are extremely reactive, so it is preferred that neither the nitrogenous base nor any cosolvent included therewith contain groups which compete with the CWA and react with the solvated electrons. Such groups include, for example, aromatic hydrocarbons groups which may undergo the Birch Reduction, and acid, hydroxyl, peroxide, sulfide, halogen, and ethylenic unsaturation, and they should, in general, be avoided so as to prevent undesirable side reactions. Water should also be avoided, although water can be effectively utilized in the product work-up. In some cases it has been reported that the presence of an hyroxyl-containing alcohol may be beneficial.

In spite of these admonitions, it has been found, quite surprisingly, that even if a dissolving metal reduction is carried out in the field in the presence of moisture, air, and a range of contaminants which could be expected to interfere, the destruction of CWA's by the method of this invention is, nevertheless, very successful.

Although other conditions can sometimes be employed to advantage, the method of this invention is preferably carried out at a temperature in the range of about −35° C. to about 50° C. and, although the reaction can be carried out at subatmospheric pressure, it is preferred that the method be performed in the pressure range of about atmospheric pressure to about 21 $Kg/cm^2$ (300 psi). More preferably, the reaction is carried at about room temperature, e.g., about 20° C. (68° F.), under a pressure of about 9.1 $Kg/cm^2$ (129 psi).

In carrying out the method of this invention, the ratio of nitrogenous base/CWA in the reaction mixture is preferably between about 1/1 to about 10,000/1 on a weight/weight basis, more preferably between about 10/1 and 1000/1, and most preferably between about 100/1 and about 1000/1.

The amount of active metal, if employed in the reaction mixture, should preferably be in the range of about 0.1 percent to about 12 percent by weight based on the weight of the mixture; more preferably between about 2 percent and about 10 percent, and most preferably between about 3.5 percent and about 4.5 percent.

On a metal weight/CWA weight basis the reaction mixture preferably contains between about 0.1 and 2.0 times as much metal as CWA, more preferably between about 0.15 and about 1.5 times as much, and most preferably between about 0.2 and about 1.0 as much metal as CWA. In any case where active metal is employed, on a molar basis the reaction mixture should contain at least 2 moles of the active metal per mole of CWA.

The course of the reaction involving solvated electrons can be followed readily by monitoring the blue color of the reaction mixture which is characteristic of solutions of nitrogenous base and active metal. When the blue color disappears, it is a signal that the CWA has reacted with all of the solvated electrons, and more active metal or solution containing solvated electrons can be added to ensure that at least two moles of active metal have reacted per mole of CWA. In many cases it is preferred that the addition of active metal or additional solvated electrons be continued until the CWA has completely reacted with the solvated electrons, a state which is signaled when the blue color of the mixture remains. The rate of the reaction between the CWA's and solvated electrons is rapid, the reaction in most cases being substantially complete in a matter of minutes to a few hours.

In an especially preferred embodiment of the method of this invention, the process comprises first creating a reaction mixture prepared from raw materials which include: (1) nitrogenous base selected from the group consisting of ammonia, amines, and mixtures thereof; the amines being selected from the group consisting of methylamine, ethyl amine, propylamine, isopropylamine, butylamine, and ethylenediamine; (2) at least one chemical warfare agent selected from the group consisting of vesicants, nerve agents, and mixtures thereof, the formula of said vesicants containing at least one group of the formula:

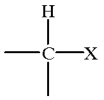

in which X is halogen; said nerve agents being represented by the formula:

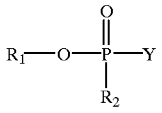

in which $R_1$ is alkyl, $R_2$ is selected from alkyl and amino, and Y is a leaving group; and (3) at least one active metal selected from Groups IA and IIA of the Periodic Table and mixtures thereof; and then reacting the mixture to destroy at least about 90 percent, preferably at least about 95, and most preferably at least about 99 percent by weight of the chemical warfare agent.

The CWA destruction reaction may be performed in the native container, particularly in those instances when there is a sufficient volume of unoccupied space remaining to accommodate the reactants required for performing the process. Likewise, the container housing the chemical warfare agent should be in suitable condition for conducting the reaction. A container of chemical warfare agents which has been buried in the ground for some time period and has undergone corrosion may not be in suitable condition as an in-situ type vessel. However, the difficulty in these cases arises, not because the CWA may be decomposed, but because the container may not provide sufficient physical integrity to contain the reaction mixture.

The invention may also be performed in a reactor or reactor system suitable for accommodating original native containers which may have an insufficient volume of unoccupied space to allow for the introduction of the required amount of nitrogenous base or externally-produced solution of solvated electrons, or are in such poor physical condition as not to be able to contain and confine the reaction. In these cases, the CWA destruction can be carried out by opening the native containers, or severing them and placing the opened or severed container parts with the chemical warfare agent in a larger dedicated reactor system or reaction vessel for purposes of conducting the CWA destruction reaction. Using this procedure, both the chemical warfare agents and the native containers can be simultaneously treated.

No matter whether the destruction of the CWA is carried out in its native container, in the field, in a reactor system, or in a reaction vessel using a bulk source of the CWA, if the preferred embodiment of the method, which utilizes solvated electron technology, is to be employed, at least two moles of solvated electrons are ordinarily required for every mole of the CWA to be destroyed. This follows since it is believed that two moles of solvated electrons are required to break a chemical bond; see equation (II) above. On the other hand, it may be beneficial to employ excess solvated electrons, that is, sufficient solvated electrons to break as many as perhaps about two to four bonds in the CWA, for example. The products resulting from the more extensive reaction of the CWA can be easier to handle from a safety and/or environmental point of view.

Regardless of whether the destruction of the CWA is carried out in its native container or in a reactor system using a bulk supply of the CWA, and regardless of whether the reaction is performed with nitrogenous base alone or with solvated electrons, the process may include an optional, but often preferred step following the initial destruction of the CWA. That is, subsequent to the application of the nitrogenous base or solvated electrons, the residual product mixture is optionally (but desirably) oxidized, preferably by non-thermal means, by reacting the products of the CWA destruction with a chemical oxidant. Preferably, however, before introducing the oxidant, residual nitrogenous base is removed, e.g., ammonia is removed from the reactor by allowing remaining vapors to evaporate. Representative oxidants and mixtures of oxidants which may be employed include hydrogen peroxide, ozone, dichromates and permanganates of alkali metals, and so on. In carrying out this additional step optimally, the process requires introducing into the reactor system or chemical warfare agent housing a sufficient amount of a suitable oxidizing agent to completely react with any residual organic products remaining from the initial reaction with the solvated electrons or nitrogenous base. The purpose of this oxidation step is to take any residual organic moieties to their highest possible oxidation states, and if reasonably achievable, to carbon dioxide and water.

Hence, if post-destruction oxidation is to be employed, the chemical warfare agent is first reacted with nitrogenous base, preferably including solvated electrons, followed by a secondary treatment step which comprises reacting the residuals with an oxidizing agent.

Unless specifically stated otherwise, the following Examples, illustrating the batch-wise destruction of representative CWA's, were carried out within a vented hood in a stainless steel, pressurizable reaction vessel equipped with an optional heating/cooling jacket and having an internal volume of approximately 2 liters. The vessel was equipped with mechanical stirring, a removable sight glass port, a thermometer port, an inlet port connected to a high performance liquid chromatography pump which was used to add the CWA from an external container, a port in the vessel headspace for a pressure gauge, and, in some Examples, with a scrubber train designed to recover any condensibles or volatiles emitted from the reaction vessel, the scrubber train being connected with the reaction vessel headspace via a needle valve. The reaction vessel also contained a port through which the nitrogen-containing base was added, and a drain port at the bottom of the reaction vessel for product recovery. A data logger was employed to follow reaction conditions. In a number of Examples, the volume of the reactants was limited to approximately one liter, leaving about one liter of headspace.

In each Example, the reactive metal in the desired amount was introduced into the reaction vessel by removing the sight glass, adding the metal, and resecuring the sight glass to seal the vessel. The nitrogen-containing base was then pumped into the reaction vessel with stirring, dissolving the metal and producing the intense blue color characteristic of the solvated electron. The chemical warfare agent, supplied by the U.S. Army, was next pumped into the reaction vessel.

Following the CWA destruction reaction, in most instances the contents of the reaction vessel were drained and analyzed, in some cases after reaction with water. The sodium and arsenic analyses was carried using the ICP (inductively coupled plasma) method. An ion-selective electrode method was employed for fluorine and chloride, the EPA methylene blue method for sulfide, and instrumental elemental analysis for carbon and hydrogen. The gas in the reactor headspace and the reaction mixture in some cases were subjected to gas chromatography/mass spectroscopy to identify volatile organic components. Wet chemical methods were employed to determine the residual CWA content, the DB-3 method for HD mustard, the 1,2-ethanedithiol derivitization procedure for Lewisite, and cholinesterase inhibition for the VX, GA, GB, and GD nerve agents.

EXAMPLE 1

Destruction of HD Mustard, Di(2-chlorethyl)sulfide

Run A

To the reaction vessel was added sodium metal (15.04 g, 0.65 mole) followed by anhydrous liquid ammonia (1 l, ~680 g, ~40 moles) with stirring. The liquid CWA, HD (10.26 g, 0.0645 mole), was slowly added at such a rate that the pressure in the vessel was not allowed to exceed 9.8 $Kg/cm^2$. The temperature of the reaction mixture did not exceed 21° C. Upon complete addition, the reaction mixture, a slurry, retained a blue color, indicating excess solvated electrons.

The slurry was drained from the reaction vessel, and water (~250 ml) was added to the slurry to destroy the excess solvated electrons and dissolve any salts present. Ammonia was allowed to vent from the aqueous mixture overnight in the hood. The resulting fluid mixture was analyzed to determine mass balance and identify the reaction products. The following results were obtained:

| Element | Added(g) | Recovered(g) | (%) | Identification |
|---|---|---|---|---|
| Sodium | 15.04 | 15.0 | 99.7 | NaCl, NaOH |
| Sulfur | 2.05 | 1.98 | 96.5 | $Na_2S$, NaHS |
| Carbon | 3.61 | 2.45 | 67.9 | $[CH_2{=}CH]_2S$ |
| Chlorine | 4.6 | 4.6 | 100.0 | NaCl |

The headspace gas phase was analyzed by gc/ms and found to contain <0.14 g organic carbon species, and they were tentatively identified as ethanol (0.02 g), ethanediol (0.008 g), propanamine (0.01 g), butanethiol (0.02 g), and ethylpropanamine (0.06 g).

Run B

Example 1A was repeated, except that all of the off-gases were scrubbed in the following series of scrubber solutions: dodecane (243 ml), dodecane (245 ml), dodecane (246 ml), water (263 ml), 1 M aq. hydrochloric acid (251 ml), and dodecane (255 ml). In this case, 10.64 g, 0.46 mole of sodium was employed, and 18.34 g, 0.115 mole of HD was added, causing the blue color to begin to fade, indicating that all of the solvated electrons were reacted. An additional 1.95 g, 0.085 mole of sodium was added to ensure a slight excess of solvated electrons.

The reaction mixture was drained from the reaction vessel, and water (100 ml) was added to destroy excess solvated electrons. The aqueous slurry was allowed to vent overnight through a dodecane scrubber (257 ml) to trap any organic off-gas. The final volume of the dodecane scrubber was 187 ml.

Both the aqueous slurry and the scrubber systems were analyzed for the presence of HD. No residual HD was detected, which indicated, within the limits of its detectability, that the HD had been 99.9999999 percent destroyed. In terms of the stoichiometry, 1 mole of HD per 4.76 moles of Na reacted, which is consistent with the breaking of 2 carbon-chlorine bonds in the HD molecule. The following materials balance was determined:

| Element | Added(g) | Recovered(g) | (%) | Identification |
|---|---|---|---|---|
| Sodium | 12.6 | 12.9 | 102 | NaCl, NaOH |
| Sulfur | 3.7 | 3.7 | 100 | $Na_2S$, NaHS |
| Carbon | 6.4 | 3.8 | 59 | $[CH_2{=}CH]_2S$ |
| Chlorine | 8.2 | 7.8 | 98 | NaCl |

As in Run A, the carbon-containing products were primarily non-volatile. This was confirmed by extracting the aqueous slurry with deuterated chloroform and analyzing the extract by means of NMR spectroscopy. The headspace gas was also analyzed by gc/ms for the presence of volatile organics; the results were: ethanol (0.03 g), ethanethiol (0.01 g), 2-butenal (0.2 g), butanethiol (0.003 g), and 1,3-dithiane (0.04 g). The contents of the various scrubbers were also analyzed; only ethanol (0.06 g) was detected. Analysis for sulfur-containing species found them to be present in <1 ppm concentration.

Run C

A larger scale HD destruction was carried out in an enlarged version of the reaction vessel described above. This larger version included an electrical conductivity probe to monitor the reaction. The reaction vessel was loaded with anhydrous liquid ammonia (~4.4 l, ~2.99 kg, ~176 moles) followed by sodium (169.1 g, 7.35 moles). The sodium was added incrementally in such a manner that the concentration of solvated electrons in the solution was initially 4% by weight. As the sodium was consumed, additional sodium was added incrementally. The HD (310 g, 1.95 mole) was added to the stirred reactor in such a manner that the temperature of the mixture did not exceed 21° C., and the pressure was kept below 9.8 Kg/cm$^2$. At this point the slurry in the reactor was drained into a separate vessel and allowed to stand, the evaporating ammonia being led through a scrubber.

A second charge of liquid ammonia (4.4 1) was added to the reaction vessel, and additional sodium (209.5 g, 9.11 moles) was added incrementally, followed by the addition of the HD agent (326 g, 2.05 mole). After addition of all the sodium, the reaction mixture in the form of a slurry was drained from the reaction vessel and into the separate vessel holding the product mixture from the first charge.

Water (30 ml) was added to the combined product to destroy any unreacted sodium, and the combined product was transferred to a third container. The reaction vessel and separate container were washed with 600 ml of water, and the rinse water was collected separately.

The combined product was allowed to stand over the weekend, during which time the product solidified. Water was added to dissolve the solid, but this was only partially successful. The combined product was not homogeneous but consisted of a transparent liquid, clear crystals, and a white to gray sediment. These difficulties made any determination of the materials balance suspect.

However, analysis of the heterogeneous combined reaction product demonstrated that 99.999999 percent of the HD agent had been destroyed, and it was determined that the reaction stoichiometry was one mole of HD agent/4.1 moles of sodium. Further analysis led to the conclusion that the reaction products were the same as those reported above for the smaller scale runs.

Run D

A crusty, gelled HD heel (1.97 g, 0.012 mole) was dissolved in 800 ml of liquid ammonia in laboratory glassware. Sodium hydroxide (390 mg in 8.0 ml water) was added, adjusting the mixture to neutral pH. Sodium metal (5.18 g, 0.23 mole) was added in about 0.06 g increments until the reaction mixture remained blue colored. The ammonia was then allowed to evaporate, and the residue was analyzed for HD. As a result of the analysis it was concluded that at least 99.999999 percent of the HD had been destroyed.

EXAMPLE 2

Destruction of Lewisite Vesicant, Dichloro-(2-chlorovinyl)arsine

Run A

The headspace of the reaction vessel was connected to a train of five scrubbers, each containing about 250 ml; i.e., two water, followed by aqueous HCl and then two dodecane. Sodium (20.5 g, 0.89 mole) and liquid ammonia (~1 l, ~680 g, ~40 moles) were added to the reaction vessel, and the mixture was stirred until the metal was dissolved, producing the characteristic blue color of solvated electrons. The Lewisite CWA (18.12 g, 0.087 mole) was added to the vessel at a rate such that the temperature of the reaction mixture did not exceed 21° C. and the pressure in the vessel remained below 9.8 kg/cm$^2$. The solution remained intensely blue after the addition, indicating a solvated electron excess.

The slurry was drained from the vessel and combined with liquid ammonia used to rinse the vessel. The ammonia was allowed to evaporate from the slurry in the back of the hood. The slurry was analyzed for residual Lewisite, and none was detected. NMR spectroscopy detected alkanes in the slurry. No arsenic, organics, or Lewisite were detected in any of the scrubbers. Further analysis of the slurry led to the following materials balance:

| Element | Added(g) | Recovered(g) | (%) | Identification |
|---|---|---|---|---|
| Sodium | 20.54 | 18.1 | 88 | NaCl |
| Chlorine | 9.24 | 9.25 | 100 | NaCl |
| Carbon | 2.1 | 1.6 | 75 | sodium acetylide |
| Arsenic | 6.5 | 5.8 | 89 | $Na_3As$ |

Run B

Run 1 is repeated, except that, following evaporation of the residual ammonia from the slurry, the residual solid product is treated in an Erlenmeyer flask with 100 ml 30% aqueous hydrogen peroxide. Upon stirring the mixture, the solid almost completely dissolves, the contents of the flask become warm, and gas is evolved from the solution.

EXAMPLE 3

Destruction of VX Nerve Agent, Ethyl S-2-Diisopropyl Aminoethyl Methylphosphorothioate Run A Sodium (10.41 g, 0.45 mole) and liquid ammonia (1 l) were added to the reaction vessel, producing the blue colored solution characteristic of the solvated electron. The liquid VX CWA was slowly pumped into the solution in the reaction vessel at such a rate that the temperature did not exceed 21° C. and the pressure remained below 9.8 Kg/cm$^2$. A total of 54.77 g, 0.205 mole of VX was added before the blue color of the reaction mixture began to fade. Additional sodium (9.56 g, 0.42 mole) was then added and stirring continued to produce an intense blue color in the mixture. Additional VX (47.64 g, 0.18 mole) was added before the color again began to fade. More sodium (1.12 g, 0.05 mole) was then added to ensure complete reaction of the VX. A total of 21.09 g, 0.92 mole of sodium was used to react with 102.41 g, 0.38 mole of VX. Thus, the stoichiometry was 2.42 moles of VX per mole of sodium, which is consistent with the breaking of one bond in the VX molecule.

The slurry was drained from the reaction vessel and combined with two ammonia reaction vessel rinses. The combined mixture was diluted with water and then allowed to vent in the back of the hood overnight. The volume of the final product mixture was 259 ml. The product mixture was analyzed for VX, and no VX was detected, indicating the VX had been at least 99.9999999 percent destroyed. The reaction mixture was analyzed to yield the following materials balance:

| Element | Added(g) | Recovered(g) | (%) | Identification |
|---|---|---|---|---|
| Sodium | 21.09 | 17.8 | 84 | NaOH |
| Sulfur | 12.3 | 10.9 | 89 | mecaptans and $Na_2S$ |
| Carbon | 50.7 | 32.0 | 63 | phosphonates |
| P | 11.9 | 10.6 | 89 | " |

Analysis of the product mixture by gc/ms indicated the presence of the following volatile organics: ethylpropaneamine (0.07 g), propaneamine (0.02 g), methylethylbutaneamine (0.01 g), and butanethiol (0.03 g). Further analysis of the product mixture by NMR spectroscopy indicated a mixtures of organic products, some containing phosphorous. The NMR spectra of the latter, compared to the NMR spectrum of VX, showed the complete absence of the phosphorous absorption at 54.6 ppm, but the $P-CH_3$ structure remained intact as did the P=O structure. While not desiring or intending to be bound by this explanation, these observations are consistent with breaking the P-S bond and subsequent hydrolysis of the phosphonate moiety.

Run B

This run employed sodium (15.12 g, 0.56 mole) and liquid ammonia (1 l) as before to yield the blue colored solution containing solvated electrons. To this stirred solution was slowly added the VX CWA (15 g, 0.056 mole) at a rate such that the temperature did not exceed 21° C. and the pressure remained below 9.8 $Kg/cm^2$. In this Example, a series of scrubbers was connected to the reaction vessel headspace during the reaction. The scrubber train included distilled water, distilled water, 0.1 N aq HCl, and two dodecane scrubbers, the volume of each scrubber being about 250 ml. Very few bubbles were observed to pass through the scubbers during the reaction; in fact, no bubbles were noticed passing through the last dodecane scrubber.

Upon completion of the reaction, the slurry contents of the vessel were drained and combined with liquid ammonia rinses of the reaction vessel. The mixture was allowed to vent ammonia overnight in the back of the hood.

The resultant vented slurry was analyzed for residual VX content, and none was detected, leading to the conclusion that 99.99999999 percent of the VX was destroyed. Analysis of the scrubber contents detected no VX there either; ammonia was detected in the aqueous scrubbers, and the phosphorous content in the scrubbers was <5 ppm. The materials balance was:

| Element | Added(g) | Recovered(g) | (%) | Identification |
|---|---|---|---|---|
| Sodium | 15.12 | 12.6 | 83 | NaOH |
| Sulfur | 1.77 | 1.44 | 81 | Mercaptans, $Na_2S$ |
| Carbon | 7.3 | 5.0 | 69 | Phosphonates |
| P | 1.7 | 1.0 | 60 | " |

Run C

Using the same, somewhat enhanced reaction vessel described in Example 1C, a larger scale version of the VX CWA destruction was carried out. The liquid ammonia (~4.5 l, ~3.06 kg, ~180 moles) was first added to the reaction vessel, followed by sodium metal (106.6 g, 4.63 moles). The metal was added in increments so as to maintain the sodium concentration at about 4% by weight by monitoring the conductivity of the mixture. The VX vessicant (329.5 g, 1.23 moles) was then added at a rate to maintain the temperature below 21° C. and the pressure below 9.8 $kg/cm^2$. When the reaction was complete, signaled by a persistent blue color, the slurried contents of the reaction vessel were transferred to a second vessel and the ammonia allowed to evaporate.

The reaction vessel was charged once more with liquid ammonia (4.5 l) and sodium (29.6 g, 1.29 mole), added incrementally. Additional VX was added incrementally as before to maintain the temperature and pressure conditions used in the first batch. The resultant reaction product was added to the product from the first batch, and water (20 ml) was added to the combined product. The combined reaction products were a thick, caustic, butterscotch-colored mixture (980 ml) which also contained white particles.

Analysis of the mixture led to the conclusion that one mole of the VX vessicant reacted with 2.7 moles of sodium, a result similar to that observed in the smaller scale runs. In addition, the reaction products were substantially the same as those produced in the other runs. Analysis of the product for the VX CWA led to the conclusion that at least 99.9999999 percent of the agent had been destroyed. The material mass balance was found to be:

| Element | Added(g) | Recovered(g) | (%) | Identification |
|---|---|---|---|---|
| Sodium | 136.2 | 136 | 100 | NaOH |
| Sulfur | 57.6 | 51.3 | 89 | Mercaptans, $Na_2S$ |
| Carbon | 237.5 | 179 | 76 | Phosphonates |
| P | 55.7 | 51.9 | 90 | " |

Run D

Run A is repeated, except that lithium (6.2 g, 0.9 mole is substituted for the sodium. Substantially the same results are obtained as in Run A.

EXAMPLE 4

Destruction of GA Nerve Agent, Ethyl N,N-Dimethyl Phosphoramidocyanidate

Run A

The reaction vessel was equipped with means to collect any gaseous products leaving the reaction mixture; the vessel headspace was connected to a series of six scrubbers through which gas exiting the vessel must pass. Three dodecane-filled scrubbers were followed in succession by water, 1 M HCl, and dodecane.

Sodium (10.45 g, 0.45 mole) was added to the reactor, followed by anhydrous liquid ammonia (~1 l, ~680 g, ~40 moles) with stirring. When the sodium had dissolved and the intense blue color of solvated electrons was evident, the GA CWA (6.89 g, 0.043 mole) was added at such a rate that the temperature of the reaction mixture did not exceed 21° C. and the pressure remained less than 9.8 $Kg/cm^2$.

When the reaction was complete, the resultant slurry was drained from the vessel, the liquid ammonia used to rinse the vessel was added, and the ammonia was allowed to evaporate. The solid residue which resulted weighed 17.55 g. The residue was analyzed for residual GA agent, and none was detected, nor were any organic materials found in the scrubber train. Thus, it was concluded that 99.9999999999 percent of the CWA had been destroyed. Further analysis of the solid residue provided the following materials balance:

| Element | Added(g) | Recovered(g) | (%) | Identification |
|---|---|---|---|---|
| Sodium | 10.45 | 8.8 | 84 | NaCN, $NaNH_2$ |
| Cyanide | 1.09 | 1.09 | 100 | NaCN |
| Carbon | 2.4 | 2.1 | 87 | Phosphonates |
| P | 1.3 | 1.5 | 114 | " |

Run B

Run A is repeated, except that the anhydrous liquid ammonia is replaced with ethylamine (1.5 l, 1.04 kg, 23 moles). Substantially the same results are obtained as in Run A.

Run C

Run A is repeated, except that the active metal was omitted from the reaction mixture. Upon completion of the reaction the mixture was analyzed for GA content. As a result it was concluded that the GA had been at least 99.998 percent destroyed.

EXAMPLE 5

Destruction of Nerve Agent GB, Isopropyl Methyl Phosphonofluoridate

Run A

Sodium (~15.0 g, ~0.65 mole)and ammonia (~1 l) were combined in the reaction vessel with stirring. The vessel headspace was led into a scrubber train. Upon complete dissolution of the sodium, the GB CWA (10.45 g, 0.075 mole) was added slowly so as to maintain the temperature of the reaction mixture no higher than 21° C. and the pressure below 9.8 $Kg/cm^{2.}$ Following completion of the reaction, the contents of the vessel were drained. Water was not added, but the ammonia was allowed to evaporate in the hood, leaving a solid residue which was dissolved in water prior to analysis. The residue was analyzed for unreacted GB; none was detected. No GB, or any organic compound, was detected in the scrubbers either. These results indicate that at least 99.99999999999 percent of the agent was destroyed. Further analysis of the residue provided the following materials balance:

| Element | Added(g) | Recovered(g) | (%) | Identification |
|---|---|---|---|---|
| Sodium | 15.0 | 10.4 | 69 | NaF |
| Fluorine | 1.35 | 0.93 | 68 | NaF |
| Carbon | 3.4 | 2.6 | 75 | Phosphonates |
| P | 2.2 | 1.2 | 52 | " |

Run B

Liquid ammonia (1 1) and metallic sodium (10.24 g, 0.45 mole) were combined in the reaction vessel with stirring, and the vessel was sealed. The GB CWA was added to the reaction mixture at a rate to maintain the temperature no higher than 21° C. and the pressure below 9.8 $Kg/cm^2$. After 26.78 g, 0.19 mole, of the GB had been added, the blue color of the solution began to fade. At that point additional sodium (10.55 g, 0.46 mole) was added with stirring, whereupon the metal dissolved and the blue color returned. The addition of GB CWA was then resumed, an additional quantity of 25.61 g, 0.18 mole, being added, causing the color to again begin to fade. The cycle of adding more sodium followed by additional GB CWA was repeated two more times, at the conclusion of which the blue color of the solution again began to fade. At this point, an additional 1.72 g, 0.07 mole of sodium was added to ensure excess solvated electrons, and the reaction was concluded. A total of 92.0 g, 0.66 mole, of the GB agent was reacted with a total of 36.63 g, 1.6 moles, of sodium; i.e, 1 mole of GB reacted with about 2.5 moles of sodium, which is consistent with breaking 1 chemical bond in the GB molecule. While neither desiring nor intending to be bound by this speculation, it is believed likely that the P-F bond was broken.

Upon completion of the reaction, the heterogeneous reaction mixture was drained from the vessel and combined with two liquid ammonia rinses of the vessel prior to adding water and allowing the mixture to vent overnight in the hood. The resultant solid was analyzed for the presence of the GB agent, and none was detected, indicating that the GB agent had been at least 99.9999999 percent destroyed. Further analysis of the slurry provided the following materials balance:

| Element | Added(g) | Recovered(g) | (%) | Identification |
|---|---|---|---|---|
| Sodium | 36.63 | 37.9 | 90 | NaF |
| Fluorine | 11.96 | 11.4 | 95 | NaF |
| Carbon | 30.36 | 19.9 | 66 | Phosphonates |
| P | 20.24 | 16.1 | 80 | " |

NMR spectroscopy was relied on for further identification of the reaction products. Noteworthy is the fact that the NMR spectrum showed a complete absence of the $^{31}P$ doublet at 28 ppm, but was consistent with an intact double bond to phosphorous. While neither desiring nor intending to be bound hereby, it is tentatively concluded that the P-F bond was broken in the reaction, because no P-F coupling was observed in the NMR spectrum. The P-$CH_3$ structure appeared to remain intact, however.

Run C

A larger scale run was carried out using the enhanced larger scale reaction vessel described in Example 1C. Liquid ammonia (~4.5 l) was first added to the reaction vessel, followed by sodium (139 g, 6.04 moles), added incrementally with stirring so as to maintain the sodium concentration at about 4% by weight. The GB CWA (292 g, 2.09 moles) was added slowly in order to maintain the temperature no higher than ~21° C. and the pressure below 9.8 $Kg/cm^2$. After complete addition of the agent, the slurried reaction mixture was pumped into a separate vessel, and the ammonia was allowed to evaporate.

A second charge of liquid ammonia (4.5 l) was added to the reaction vessel, and additional sodium (117 g, 5.1 moles) was added incrementally as before. The GB agent (279 g, 2.0 moles) was added as in the first batch, resulting in a slurried reaction product. This product was added to that obtained in the first batch, and 15 ml of water was added to the combination. The resultant product (1250 ml) was a thick, gray, foamy, nonhomogeneous liquid.

Analysis of the product for residual GB agent led to the conclusion that the GB agent had been at least 99.9999999 percent destroyed in the reaction. Further, it was concluded that one mole of the GB agent/2.6 moles of sodium had reacted, which is similar to the stoichiometry observed in the smaller scale reactions.

The reaction products were the same as those found in the smaller scale reactions, except that isopropanol was also found in the reaction mixture. The materials mass balance was found to be:

| Element | Added(g) | Recovered(g) | (%) | Identification |
|---|---|---|---|---|
| Sodium | 256 | 225 | 88 | NaF |
| Fluoride | 74 | 54 | 72 | NaF |
| Carbon | 188 | — | — | — |
| P | 125 | 116 | 93 | Phosphonates |

Run D

Run A is repeated, except that calcium (14 g, 0.35 mole) is substituted for the sodium. The results are substantially the same as in Run A.

Run E

Run A is repeated, except that ethylene diamine (1.5 l) is employed in place of the anhydrous liquid ammonia. The results are substantially the same as in Run A.

EXAMPLE 6

Destruction of GD Nerve Agent, Pinacolyl Methyl Phosphonofluoridate

Run A

The reaction vessel headspace was connected to a train of scrubbers, that is, three dodecane traps followed by water and aqueous HCl traps, each scrubber containing about 250 ml of liquid. To the so-equipped reaction vessel were added sodium metal (3.9 g, 0.17 mole) and liquid ammonia (~1l) with stirring. Following dissolution of the sodium, the GD CWA (9.41 g, 0.05 mole) was added at such a rate that the temperature did not rise above 21° C. and the pressure in the vessel remained below 9.8 $Kg/cm^2$. The reaction mixture remained intensely blue after the reaction, indicating an excess of solvated electrons. The slurry in the vessel was drained, and the liquid ammonia washings of the vessel were added to the slurry. About 100 ml of water was added, and the mixture was allowed to vent ammonia in the back of the hood.

The contents of the scrubbers were identified by gc and found to contain 0.08 g dimethylbutane, 0.16 g methylpentene, and 0.09 propoylcyclopropane. No inorganics were found in the scrubbers.

The vented slurry was analyzed for residual GD agent, and none was detected. As a result it was concluded that at least 99.9999999 percent of the GD agent had been destroyed. NMR spectroscopic investigation of the slurry suggested that the P-F bond was broken in the reaction, on the basis of the absence of P-F coupling in the spectrum. The slurry was also found to contain 0.12 g methylpentene. Further analysis of the slurry provided the following materials balance:

| Element | Added(g) | Recovered(g) | (%) | Identification |
|---|---|---|---|---|
| Sodium | 3.8 | 2.9 | 76 | NaF, NaOH |
| Fluorine | 0.94 | 0.93 | 99 | NaF |
| Carbon | 4.32 | 3.6 | 83[a] | Phosphonates |
| P | 1.6 | 0.90 | 54 | " |

The aforesaid Examples illustrate the method of this invention carried out on individual batches of CWA. The process of this invention can also be carried out in the reactor system of this invention operated in either a batch-wise mode or continuously. The reactor system can be used, not only to carry out the destruction of chemical warfare agents, but other reactions involving similar chemistry as well.

With reference now to FIG. 1, reactor system 10 includes a number of hardware components, including reaction vessel 20 which is equipped with a heating/cooling jacket if desired and various monitors of temperature, pressure, and so forth, and is adapted to receive either nitrogenous base or a solution of solvated electrons from solvator 30 and CWA from storage vessel 40. The reactor system also incorporates condenser 50, decanter 60, dissolver 70, oxidizer 80, which is an optional component, and off gas treatment module 90, which is also an optional component. The reactor system is equipped with the auxiliary equipment necessary to control the temperature and the pressure in the various components of the system as necessary to carry out the CWA destruction under the desired values of those parameters. Many variations for each of the aforesaid hardware elements are available commercially, permitting a skilled engineer to select the optimum components for the job at hand.

Although the reactor system shown in FIG. 1 is specifically directed to the situation in which the CWA is available in bulk quantities for transfer into reaction vessel 20 from CWA storage vessel 40, it will be evident that reaction vessel 20 can be sized and access provided, if desired, to accommodate native containers of CWA, in which event storage vessel 40 and associated lines and equipment will be unnecessary. It may also be desirable to separate the empty native containers from product stream 26 prior to further processing of the product stream.

The batch-wise operation of reactor system 10 can be carried out in a manner similar to that described above in connection with the aforesaid Examples. However, the reactor system 10 can also be utilized in practicing the method continuously. Thus, this invention provides a preferred method for destroying a chemical warfare agent selected from the group consisting of vesicants, nerve agents, and mixtures thereof, the formula of said vesicants containing at least one group of the formula:

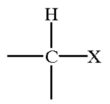

in which X is halogen; said nerve agents being represented by the formula:

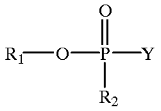

in which $R_1$ is alkyl, $R_2$ is selected from alkyl and amino, and Y is a leaving group, which method comprises providing a reactor system which includes (1) a reaction vessel to receive the CWA, (2) a solvator containing nitrogenous base in which to optionally dissolve active metal, producing a solution of solvated electrons, (3) a condenser for treating gas evolved from the reaction vessel, (4) a decanter to receive slurried reaction products from the reaction vessel and separate the reaction products into a liquid fraction and a solid fraction, and (5) a dissolver for contacting the solid fraction with water to produce a fluid mixture; continuously charging the solvator with nitrogenous base and active metal, if desired; and continuously introducing the nitrogenous base or solution of solvated electrons into the reaction vessel; continuously introducing chemical warfare agent into the reaction vessel; continuously recovering nitrogenous base from the evolved gas and introducing the recovered nitrogeneous base into the solvator as makeup; continuously receiving slurried reaction products in the decanter and continuously separating the reaction products into a solid fraction and a liquid fraction; continuously introducing the liquid fraction into the solvator as makeup; and continuously contacting the solid fraction with water in the dissolver, producing the fluid mixture; whereby the fluid mixture contains less than about 10 percent, preferably less than about 5 percent, and most preferably less than about 1 percent by weight of the chemical warfare agent introduced into the reaction vessel.

The continuous operation of the reactor system proceeds as follows: In the case of a bulk supply of CWA, solvator 30 is charged continuously with nitrogenous base, as needed (stream 31). If the embodiment of the method which utilizes solvated electrons is to be employed, active metal is also charged continuously to solvator 30 as stream 33. Stream 33 is optional; if the reaction desired to be carried out does not require active metal, stream 33 is omitted, but the rest of the operation continues as hereinafter described.

Chemical warfare agent is added to reaction vessel 20 continuously as stream 42, optionally employing pump 41, after activating stirrer 21. The temperature of the reaction mixture in vessel 20 is controlled so that the nitrogenous base and gaseous products of the CWA destruction which are in the headspace of vessel 20 pass as stream 25 into condenser 50 wherein the condensible gas, e.g., the nitrogenous base, is condensed, whereupon, at least a portion of that condensate is returned to the reaction vessel as reflux stream 52. A selected portion of the condensate is optionally tapped as stream 53 which is returned, optionally using pump 51, to the solvator 30 as makeup nitrogenous base.

Any noncondensed gas leaving condenser 50 is optionally treated in off gas treatment module 90 using, e.g., scrubber technology, to separate any gases which are innocuous for venting as stream 91 and leading any toxic gases, or scrubber solutions containing them, to dissolver 70 as stream 97.

Meanwhile, product-containing reaction mixture, as a slurry, is continuously withdrawn from reaction vessel 20 and led as stream 26 to decanter 60 where the reaction mixture is continuously decanted, producing a liquid fraction, rich in nitrogenous base, which is fed as stream 63 to solvator 30 as nitrogenous base makeup, and a solid fraction which is fed as stream 67 to dissolver 70.

Water, stream 71, is continuously fed into dissolver 70 wherein the water contacts and dissolves any water soluble component of the solid fraction. The aqueous dissolved solid generally contains inorganic salts which can be further purified and sold, if desired, or treated as waste. The material fed to the dissolver which is not soluble in water generally contains organics which can be treated as waste or fed back into reaction vessel 20 for reprocessing.

Optionally, one or the other or both the water soluble and the water insoluble components found in dissolver 70 can be fed as stream 78 to oxidation unit 80 for, preferably, chemical oxidation, output stream 81 ideally containing only carbon dioxide, water, and inorganics which can be treated as waste or values recovered therefrom.

Although this invention has been described in terms of specific examples, it is not intended to limit the invention to the specific examples. The invention is to be limited only by the breadth of the following claims.

We claim:

1. A method for destroying a chemical warfare agent, which method comprises the steps of (A) creating a reaction mixture prepared from raw materials which include:

(1) nitrogenous base;

(2) at least one chemical warfare agent selected from the group consisting of vesicants, nerve agents, cyanogen chloride, hydrogen cyanide, phosgene, chlorine and mixtures thereof, said vesicants containing at least one group of the formula:

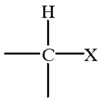

in which X is halogen; said nerve agents being represented by the formula:

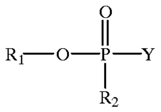

in which $R_1$ is alkyl, $R_2$ is selected from alkyl and amino, and Y is a leaving group, and (3) active metal in an amount sufficient to destroy said chemical warfare agent; and (B) reacting said mixture, said reaction mixture comprising solvated electrons.

2. The method of claim 1 wherein the reaction mixture is created by first mixing the nitrogenous base with the active metal, producing a solution containing the solvated electrons, and then combining the solution with the chemical warfare agent.

3. The method of claim 1 wherein the solvated electrons are produced in the reaction mixture.

4. The method of claim 1 in which the chemical warfare agent is in its native container and the reaction mixture is created in said native container.

5. The method of claim 1 wherein $R_2$ is alkyl, and Y is selected from the group consisting of halogen, nitrile and sulfide.

6. The method of claim 1 wherein X is chlorine.

7. The method of claim 1 wherein Y is halogen.

8. The method of claim 7 wherein Y is fluorine.

9. The method of claim 1 wherein the vesicants are selected from the group consisting of HD and Lewisite, and the nerve agents are selected from the group consisting of GA, GB, GD and VX.

10. The method of claim 1 wherein the active metal is selected from Groups IA and IIA of the Periodic Table and mixtures thereof.

11. The method of claim 10 wherein the active metal is selected from Li, Na, K, Ca, and mixtures thereof.

12. The method of claim 1 wherein the molar amount of the active metal is at least twice the molar amount of the chemical warfare agent.

13. The method of claim 1 wherein the nitrogenous base is selected from the group consisting of ammonia, amines, and mixtures thereof.

14. The method of claim 13 wherein the amines are selected from the group consisting of methylamine, ethylamine, propylamine, isopropylamine, butylamine, and ethylenediamine.

15. The method of claim 1 which further comprises oxidizing at least a portion of said reaction mixture following destruction of the chemical warfare agent.

16. The method of claim 15 wherein the oxidizing agent includes hydrogen peroxide.

17. The method of claim 1 wherein the step of reacting said reaction mixture is performed at a temperature in the range from about −35° C. to about 50° C.

18. A method for destroying a chemical warfare agent which comprises (A) creating a reaction mixture prepared from raw materials which include:

(1) nitrogenous base selected from the group consisting of ammonia, amines, and mixtures thereof; said amines being selected from the group consisting of methylamine, ethylamine, propylamine, isopropylamine, butylamine, and ethylenediamine;

(2) at least one chemical warfare agent selected from the group consisting of vesicants, nerve agents, and mixtures thereof, the formula of said vesicants containing at least one group of the formula:

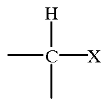

in which X is halogen; said nerve agents being represented by the formula:

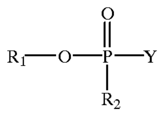

in which $R_1$ is alkyl, $R_2$ is selected from alkyl and amino, and Y is a leaving group; and (3) at least one active metal selected from Groups IA and IIA of the Periodic Table and mixtures thereof; and (B) reacting the mixture to destroy at least about 90 percent by weight of the chemical warfare agent.

19. The method of claim 18 wherein the reaction mixture comprises solvated electrons.

20. The method of claim 18 wherein the step of reacting said reaction mixture is performed at a temperature in the range from about −35° C. to about 50° C.

21. A method for destroying a chemical warfare agent, which method comprises (A) creating a reaction mixture in a reaction vessel included within a reactor system prepared from raw materials which include:

(1) nitrogenous base;

(2) at least one chemical warfare agent selected from the group consisting of vesicants and nerve agents and mixtures thereof, said vesicants containing at least one group of the formula:

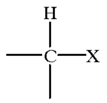

in which X is halogen; said nerve agents being represented by the formula:

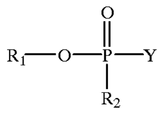

in which $R_1$ is alkyl, $R_2$ is selected from alkyl and amino, and Y is a leaving group, and (3) active metal in an amount sufficient to destroy the chemical warfare agent; and (B) reacting said mixture, said reaction mixture comprising solvated electrons.

22. The method of claim 21 wherein the reactor system further includes means for dissolving the active metal in the nitrogenous base to produce a solution comprising solvated electrons.

23. The method of claim 22 wherein the reactor system further includes means for treating gas evolved from said reaction vessel.

24. The method of claim 23 wherein said gas treating means includes means for recovering nitrogenous base and recycling it as make-up.

25. The method of claim 24 wherein the reactor system further includes decanter means for receiving reaction products from the reaction vessel and separating the reaction products into a liquid fraction and a solid fraction.

26. The method of claim 25 wherein the reaction system further includes means to contact the solid fraction with water to produce a fluid mixture.

27. The method of claim 26 wherein the reactor system further includes means for oxidizing the fluid mixture.

28. The method of claim 25 carried out continuously.

29. A method for destroying a chemical warfare agent selected from the group consisting of vesicants, nerve agents, and mixtures thereof, the formula of said vesicants containing at least one group of the formula:

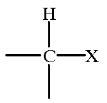

in which X is halogen; said nerve agents being represented by the formula:

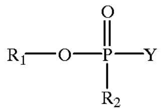

in which $R_1$ is alkyl, $R_2$ is selected from alkyl and amino, and Y is a leaving group, which method comprises:

(A) providing a reactor system which includes (1) a reaction vessel to receive the chemical warfare agent;

(2) a solvator for dissolving active metal in nitrogenous base to produce a solution of solvated electrons;

(3) a condenser for treating gas evolved from the reaction vessel;

(4) a decanter to receive slurried reaction products from the reaction vessel and separate the reaction products into a liquid fraction and a solid fraction; and (5) a dissolver for contacting the solid fraction with water to produce a fluid mixture;

(B) continuously charging the solvator with nitrogenous base and active metal, and continuously introducing the solution into the reaction vessel;

(C) continuously introducing chemical warfare agent into the reaction vessel;

(D) continuously recovering nitrogenous base from the evolved gas and introducing the recovered nitrogeneous base into the solvator as makeup;

(E) continuously receiving slurried reaction products in the decanter and continuously separating the reaction products into a solid fraction and a liquid fraction;

(F) continuously introducing the liquid fraction into to the solvator as makeup; and (G) continuously contacting the solid fraction with water in the dissolver, producing the fluid mixture;

wherein the fluid mixture contains less than about 10 percent by weight of the chemical warfare agent introduced into the reaction vessel.

30. The method of claim 29 in which the reactor system further includes an oxidizer, and the fluid mixture is continuously oxidized in the oxidizer to environmentally benign products having substantially no toxicity to mammals.

31. A reactor system for conducting a chemical reaction between an organic compound and a reagent including solvated electrons, the system comprising a reaction vessel to contain said organic compound in admixture with said solvated electron-containing reagent;

a condenser for treating gas evolved from the reaction vessel;

a decanter for receiving reaction products from the reaction vessel and separating the reaction products into a liquid fraction and a solid fraction; and a dissolver for receiving the solid fraction and treating it with water, producing a fluid mixture for further disposition.

32. The reactor system of claim 31 which further comprises a solvator for dissolving active metal in a nitrogenous base to produce said solvated electron-containing reagent.

33. The reaction system of claim 31 which further comprises an oxidizer to receive the fluid mixture from the dissolver and oxidize the mixture.

34. The reactor system of claim 31 further comprising an off-gas treatment module for scrubbing gases evolved from the reaction vessel.

* * * * *